United States Patent

[11] 3,627,615

| [72] | Inventors | Wesley L. Guiles<br>Guilford;<br>Marcus A. Hall, Branford, both of Conn. |
|---|---|---|
| [21] | Appl. No. | 10,514 |
| [22] | Filed | Feb. 11, 1970 |
| [45] | Patented | Dec. 14, 1971 |
| [73] | Assignee | Automation Industries, Inc.<br>Los Angeles, Calif. |

[54] MACHINE FOR MANUFACTURING DUCTING
16 Claims, 9 Drawing Figs.

[52] U.S. Cl. .................................................. 156/466,
156/203
[51] Int. Cl. ...................................................... B29d 23/10
[50] Field of Search ........................................ 156/200–203,
461–466, 54, 143, 64, 378; 130/122,
134, 149

[56] References Cited
UNITED STATES PATENTS

| 1,373,212 | 3/1921 | Tyler ............................. | 156/466 |
| 1,810,585 | 6/1931 | Young ........................... | 156/466 |
| 2,459,877 | 1/1949 | Gillis ............................. | 156/466 |
| 3,132,416 | 5/1964 | Hait .............................. | 156/143 |
| 3,245,852 | 4/1966 | Martin et al. ................. | 156/143 |

*Primary Examiner*—Benjamin A. Borchelt
*Assistant Examiner*—H. J. Tudor
*Attorney*—Dan R. Sadler

ABSTRACT: A machine and method are disclosed for substantially automatically and continuously manufacturing insulated air-conditioning duct in virtually unlimited lengths. The machine is effective to simultaneously feed a central reinforcing spring core, a blanket of insulating material and an outer wrapper or vapor barrier axially therethrough and secure them all together to form a continuous insulated flexible duct.

Fig. 3

MACHINE FOR MANUFACTURING DUCTING

BACKGROUND OF THE INVENTION

In a building having a centralized air-conditioning system the air is cooled, filtered, etc., by centrally located air-conditioning machinery. The conditioned air is then distributed throughout the building by a suitable distribution system. Historically, such distribution systems have utilized rigid sheet metal ducts. Because of the high thermal conductivity of metals if the exterior of the duct is exposed to the surrounding warm air, there is a very substantial warming of the otherwise cool air and considerable amount of moisture condenses on the exterior of the duct. Accordingly, a suitable insulating material has normally been applied to the exterior of the sheet metal duct. This has of necessity normally occurred subsequent to the installation.

Because of the rigid nature of sheet metal ducts they must be precisely cut to the correct dimensions and precisely mounted and installed. Since the installation in any given building is essentially customized project it does not lend itself to any significant degree of standardization. Moreover, the installation requires a considerable amount of time by a very skilled and highly paid operator, such as a sheet metal worker. As a result, such ducts are very expensive to assemble and install.

More recently it has been proposed to overcome the foregoing difficulties by utilizing essentially standardized flexible ducts. Ducts of this nature normally have an inner supporting structure or core. By way of example, the core may include a flexible spring or similar member. An insulating material such as a blanket or mat of fiber glass surrounds the core and is supported thereby. A vapor barrier surrounds this insulating blanket. Since these ducts are capable of being manufactured at a factory on at least a semimass produced basis, they are not as expensive as the sheet metal ducts.

When a flexible duct of the foregoing variety is installed it is easily cut to the desired length and quickly installed. Because of the flexible nature of the duct it is not absolutely essential the duct be precisely cut to the exact length nor that the mountings, supports, fittings, etc., be precisely positioned.

Instead, a considerable amount of latitude is possible in its dimensions and positions. Moreover, the easy cutting and handling of the flexible ducts and the loose tolerances in their installation allow the use of workmen having very little specialized skill and a minimum amount of tools and equipment.

Although flexible ducts of this nature are capable of being fabricated in a factory, their fabrication has heretofore been an essentially manual operation. In one form of production a segment of the central supporting core (for example, a spring) has been cut to the length of the finished duct and an insulating material (for example, a blanket of fiber glass mat) has been manually circumferentially or spirally wrapped one or more times round the core. Following this an outer vapor barrier has been applied around the installation by drawing a tubular vapor barrier axially over the duct or wrapping a strip of vapor barrier material around the duct and sealing its edges together.

Although this has produced a satisfactory insulated duct, such a process is very slow, cumbersome and results in high labor costs. As a consequence to a considerable extent the potential savings from this type duct have not been fully realized.

SUMMARY

The present invention provides means overcoming the foregoing limitations and difficulties. More particularly, the present invention provides means for substantially fully, automatically and continuously producing flexible insulated duct in virtually unlimited lengths with a minimum amount of human labor.

In the embodiment of the invention disclosed herein this is accomplished by providing a machine and method particularly suitable for manufacturing insulated flexible ducting at a high rate of speed by means of a continuous automatic process. The machine includes a storage and supply station, a forming station and a sealing station. In addition means are provided for continuously feeding the component parts of the duct (for example an inner core, a blanket of insulating material and an outer vapor barrier, etc.) from the storage and supply station, axially through the forming station and the sealing station.

The forming station is effective to progressively and continuously form the portions of the component parts passing longitudinally therethrough into the cylindrical shape of the duct with the two edges of the outer vapor barrier juxtaposed to each other. The sealing station is then effective to seal the two edges together to from a seam extending longitudinally of the duct.

DETAILED DESCRIPTION OF THE DRAWINGS

Figure 1:
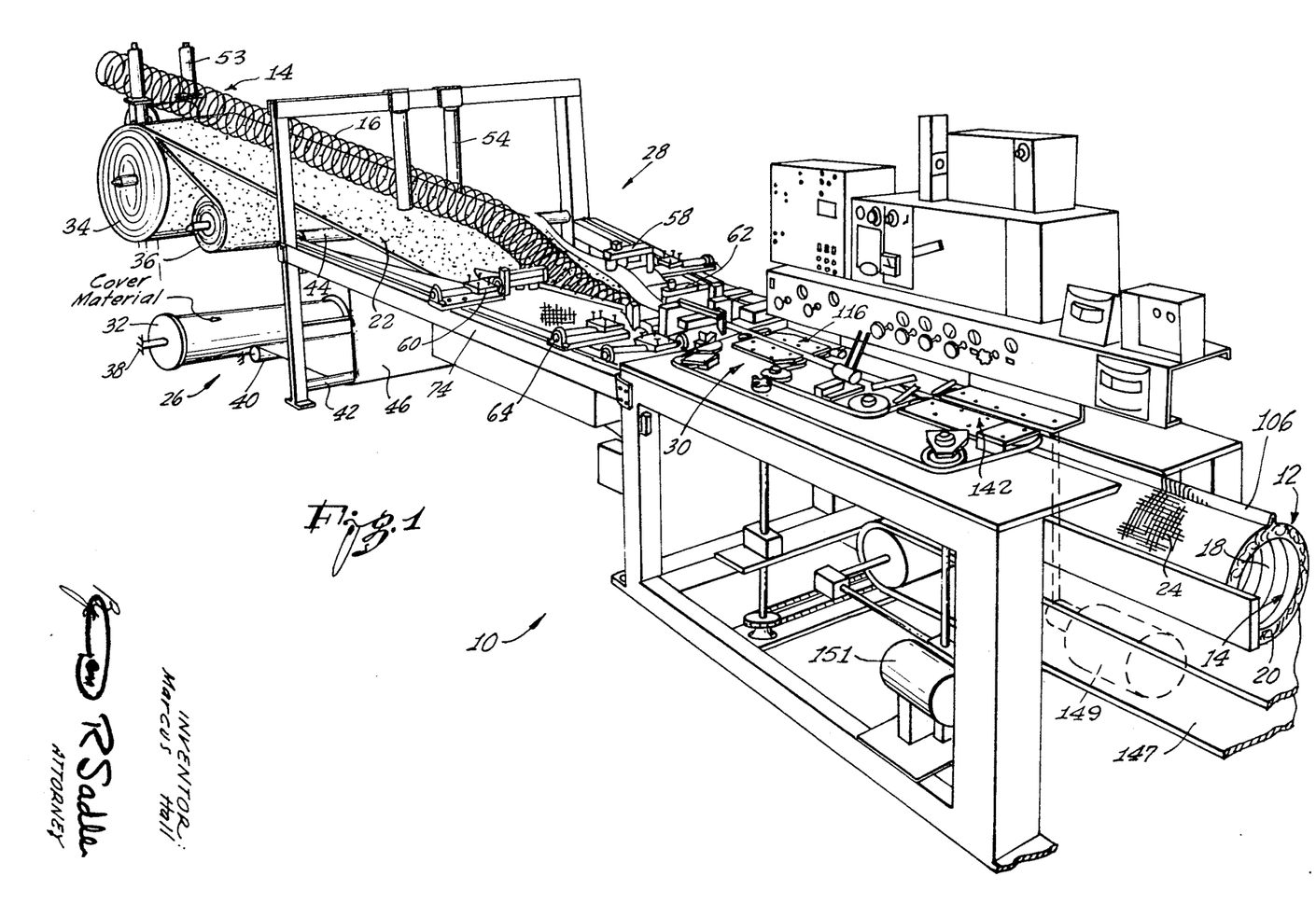
FIG. 1 is a perspective view of the output end of a machine embodying one form of the present invention.

Referring to the drawings in more detail and particularly to FIG. 1 the present invention is particularly adapted to be embodied in a machine 10 for manufacturing ducts. This machine 10 may be used for fabricating ducts of a wide variety of constructions and materials. The ducts may be utilized for a wide variety of applications. However, in the present instance the machine 10 is shown and described as being particularly adapted for manufacturing flexible insulated ducts 12 suitable for use in air-conditioning systems.

The present duct 12 includes a central core 14 which forms the "backbone" of the duct 12. This particular duct 12 is intended to be flexible and easily bent. Accordingly, the core 14 is flexible and includes a helical spring 16. This core 14 is an essentially self-supporting structure having sufficient strength (particularly in its radial direction) to insure the duct 12 being maintained in its normal cylindrical shape. However, the spring 16 is normally sufficiently weak and flexible (particularly in its axial direction) to allow the finished duct 12 to be bent and distorted as may be required for installation.

Although a bare wire spring may be used for the core 14, in the present instance a so-called "scrim cloth" 18 is wrapped around the wire spring 16 and attached thereto. A cloth of this type is a light weight, course, loosely woven material. For example, it may have on the order of 10 to 20 threads or strands per inch with a corresponding number of square openings per inch.

This "scrim cloth" 18 will, to some degree, limit the extent to which the spring 16 can be axially expanded. This is particularly true if some of the threads run axially of the core 14. However, the "scrim cloth" 18 will not materially affect the bending or axial compression of the core 14.

If desired the core 14 may be axially compressed (particularly prior to its incorporation into the duct) until the adjacent turns of the spring 16 bottom against each other. This greatly reduces the size or bulk of the core 14 whereby its storage and/or transportation etc., are facilitated. Just prior to core 14 being incorporated into the duct 12, it is allowed to expand to its full free length as limited by the "scrim cloth" 18.

The duct 12 also includes one or more layers 20 of thermal insulation which may be of any desired material. For example, if the duct 12 is to be of a rigid or semirigid nature, the insulating layer 20 may be in the form of a rigid cylinder of polyurethane foam or similar material.

In the present instance the duct 12 is intended to be flexible and easily bent. Accordingly, the insulating layer 20 is formed of a flexible material, such as a blanket 22 of fiber glass mat. This blanket 22 is normally of sufficient thickness to insure a minimum amount of heat being transferred between the outside and inside of the duct 12, particularly when cold air is flowing therethrough.

The exterior of the duct 12 is covered by an outer wrapper 24. This wrapper 24 is intended to protect the duct 12 from damage during normal handling and use. Accordingly, the wrapper should be a tough material which is not easily torn, punctured, etc., The wrapper 24 is also intended to act as a vapor barrier to keep moisture, etc., which may condense on the exterior of the duct from entering into the duct. Accordingly, the wrapper should also be waterproof. By way of example, thin sheets of plastic materials, reinforced paper, etc., have been found to be very well suited for this purpose. If a rigid core 14 is employed and the duct is not to be bent, a more rigid metallic foil may be employed.

The machine 10 for forming the duct 12 includes a material storage and supply station 26 for storing the components (i.e., the central core 14, the insulating layer 20 and vapor barrier 24) of the duct 12. In addition, a forming station 28 and a pulling and sealing station 30 are provided for forming the components into the duct 12 and sealing them together. As will be explained in more detail subsequently means are provided for continuously axially transporting the components from the storage station 26, through the forming station 28, the sealing station 30 and carrying the finished duct 12 axially away from the machine 10.

The caterpillar belts 118–120 assisted by conveyor belt 147 pull the vapor barrier through the machine. This vapor barrier does the conveying of the insulation and core pulling these materials from the storage and supply station. The guiding means described hold the vapor barrier. (This is described elsewhere). The vapor barrier forms the duct into shape.

Figure 2:
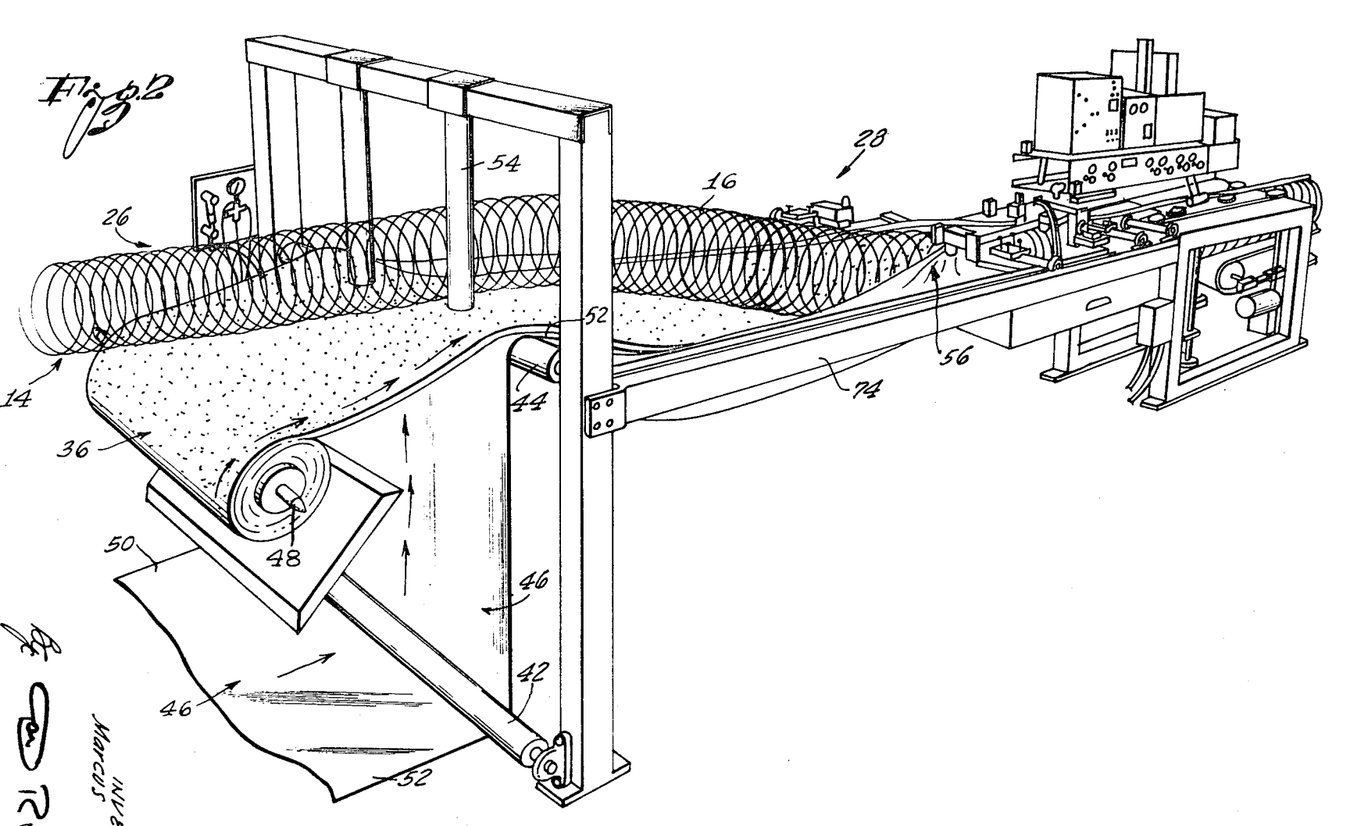
FIG. 2 is a perspective view of the same machine as FIG. 1 but taken from the input end thereof.
Figure 3:
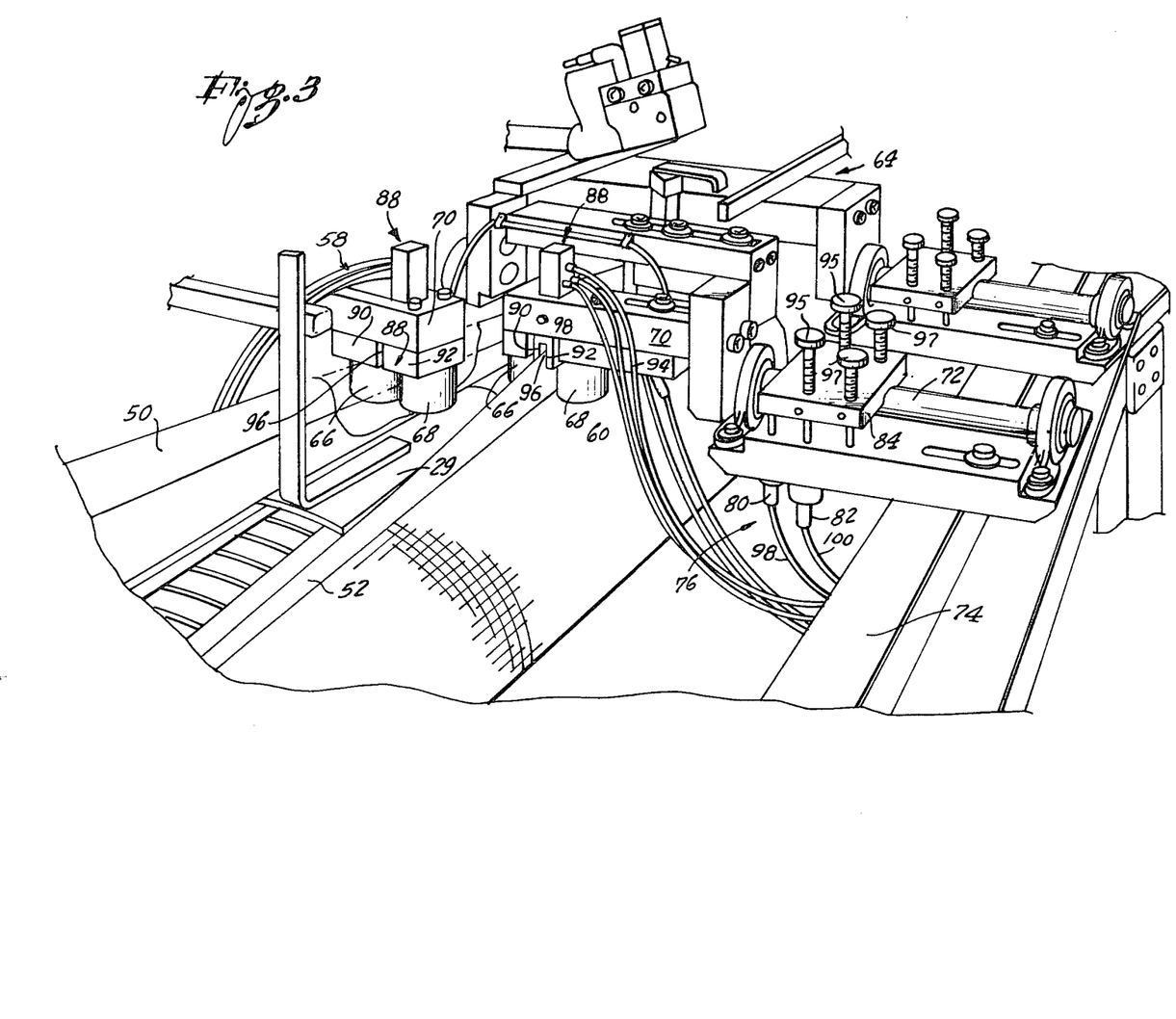
FIG. 3 is a perspective view, on a greatly enlarged scale, of a portion of the forming station in the machine.

As may best be seen in FIGS. 1 and 2 the storage station 26 includes a plurality of spools or reels 32, 34 and 36 for storing the components for the duct 12. One of the reels 32, normally the bottom one, contains a long strip 46 of the material for forming the outer wrapper or vapor barrier 24. One or more additional guides, such as the rollers 40, 42 and 44, are provided for guiding the strip 46 of material as it unwinds from the reel 32 and feeds it into the forming station 28.

Normally the strip 46 is in a plane or flat shape as it passes over the guide rollers 40, 42 and 44 and leaves the storage station 26. A roller and/or a brake may be provided on the reel 32 for controlling the amount of tension in the strip 46 as it enters the forming station 28. The roller 40 may be moveable vertically and spring bias etc., to control any slack, etc., in the strip 46 particularly during starting and stopping. The roller 44 may be adjustable vertically to accommodate the production of ducts varying diameter.

The blanket 22 of insulating material (i.e., the fiber glass mat) may be stored on a storage reel 34 adjacent the reel 32 containing the vapor barrier 24. During operation of the machine the blanket 22 is normally unwound from the reel 34 and fed over the roller 44 and laid on top of the vapor barrier strip 46 as it passes over the roller 44 and advances into the forming station 28.

It has been found desirable to provide at least one additional storage reel 36 for the blanket. It has been found that some types of fiberglass insulation must inherently be manufactured in two separate plies. When using this type of fiberglass the original roll may be mounted upon one of the reels. While the first ply is being fed into the machine the second ply is being wound into the take-up reel 36. After the first ply is completely used up from the take-up reel 36 over the top of the roller 44 and onto the strip 46 a second roll of fiberglass may be placed on the first reel 34 during this interval.

In the event the fiberglass being used is of a single ply variety a roll of fiberglass may be provided on one of the reels 34 or 36 while a roll is being consumed from the other reel. By means of this alternate feeding arrangement the insulating blanket may be continuously fed from one or the other of the storage reels.

As may be best seen in FIGS. 1 and 2 as the fiberglass is unwound from one of the spools 34 or 36 it passes over the top roller 44 and lays loosely on top of the strip 46. The strip 46 then carries the blanket 22 toward the forming station 28.

The insulating blanket 22 is normally substantially centered upon the strip 46. The strip 46 may be slightly wider than the blanket 22 whereby narrow edges 50 and 52 remains uncovered on each side of the strip 46.

The two exposed edges 50 and 52 may be of identical width. However, in this embodiment the left-hand edge 50 (looking in the direction of travel) is about twice as wide as the right-hand edge 52.

The station 26 also includes means for storing the core 14. As mentioned above, the spring core 14 may be axially compressed to a small fraction of its free size during transportation and storage to conserve space. However, the core 14 is allowed to expand to its full free length as it leaves the storage station 26. Guide means including a series of rollers 53 and 54 are provided for guiding the fully expanded core 14 over the top of the reels 34 and 36 onto the center of the insulating blanket 22.

It may thus be seen the three components (i.e., the vapor barrier, blanket of insulating material and center core) are all fed continuously from the storage station 26 axially toward the forming station 28. Various guides and tensioning means are provided for insuring the three components being properly positioned, etc.

Figures 6, 7:
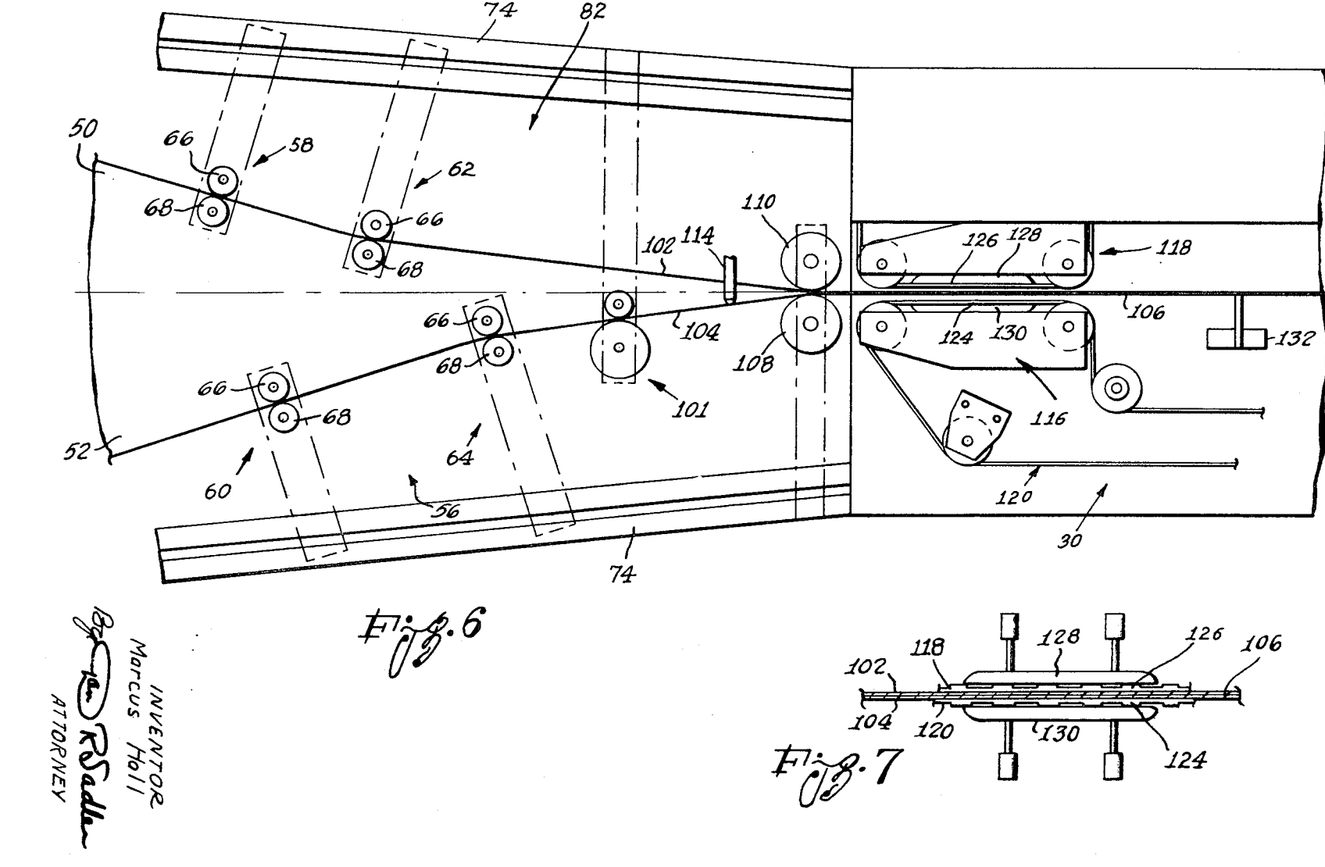
FIG. 6 is a fragmentary plan view of a portion of the machine.
FIG. 7 is a fragmentary plan view of a portion of one of the "catapillers" in the machine.

As best seen in FIGS. 1, 2 and 6 the forming station 28 includes a transition segment 56 wherein the flat strip 46 for the vapor barrier 24 and for the flat blanket 22 of insulating material are progressively shaped into a generally "U-shaped" or conical configuration around the core 14.

As the insulating blanket 22 continues to advance through the transition segment 56 the opposite sides of the blanket 22 are folded over and around the top of the core 14 so as to abut each other. At this point the blanket 22 is in a substantially cylindrical configuration completely surrounding the core 14. A suitable guide or shoot 29 may be provided over the top of the blanket 22. This is effective to insure the edges of the blanket 22 being guided together to form a smooth fitting seam and to keep the edges in position on the core.

In addition, means are provided for guiding the strip 46 and particularly the edges thereof into the sealing station 30. The guide means includes a first set of guides 58 and 60 and secondary set of guides 62 and 64. The first guides 58 and 60 are disposed on the opposite sides of strip 46 for guiding each of the edges 50 and 52.

Each of the guides 58 and 60 includes a pair of rollers 66 and 68. The rollers 66 and 68 tightly engage the opposite sides of the edge 50 or 52 and firmly compress it therebetween. Each pair of rollers 66 and 68 is mounted on the underside of its respective arm 70. Each arm 70 in turn secured to the end of a shaft 72 rotatably mounted on a side rail 74. Normally, the rollers 66 and 68 are free running and not driven. Accordingly, the edge 50 or 52 may be very easily pulled through the rollers 66 and 68.

When the axes of the two rollers 66 and 68 are straight up and down (i.e., disposed at exactly right angles to the direction of travel) the edge will move in a horizontal direction and remain at a fixed height However, if the rollers are "cocked" into the up position the edge will climb upwardly into the rollers as it travels therebetween. Conversely, if they are "cocked" into the down position the edge will move downwardly.

A separate mechanism 76 is provided for keeping the rollers 66 and 68 in the vertical position or "cocking" them either into the up position or the down position. Each mechanism 76 includes a plate 84 mounted on the shaft 72, pneumatic cylinders 80 and 82 operatively connected to a plate 84 on a shaft 72 and a pickup 88 for scanning the edge 50 or 52 as it travels between the rollers 66 and 68 and rotating the plate 84 to "cock" the rollers 66 and 68 into the up position or down position. Each of the pickups 88 produces a signal which is a function of the height of the respective edge 50 or 52 for actuating the pneumatic cylinders 80 and 82.

Although the pickup 88 may be of any desired variety such as a photoelectric cell, etc., in the present instance each pickup 88 includes a vertical block which extends through the arm 70. The lower end extends through the arm 70 and terminates above the height of rollers 66 and 68. A narrow slot 96 extends into the end of the block whereby an edge 50 or 52 may freely travel through the slot 96. The end of the block is divided by the slot 96 into two separate arms or extensions 90 and 92.

Each extension 90 and 92 include one or more airholes (not shown) aligned with a corresponding hole in the opposite extension. The holes in one of the extensions 90 (i.e., the high-pressure arm) are connected to a source of compressed air by a single flexible air line 94. Each of the holes in the other arm 92 (i.e., the low-pressure arm) are connected to a pneumatic control device (not shown) mounted on a side rail 74. The control devices are in turn connected to the cylinders 80 and 82 by a plurality of flexible hoses or lines 98 and 100. The control devices are responsive to the combination of pressures from the airholes so as to energize the cylinders 80 and 82.

The edges 50 or 52 of the strip 46 extends upwardly into the slot 96 into the general region of the aligned openings. If a portion of the edge is disposed between a pair of aligned openings, the compressed air from the opening in the high-pressure extension 90 will impinge upon the edge and be prevented from entering into the low-pressure opening. However, if no portion of the edge is disposed between aligned openings, the air escaping from the opening in the high-pressure extension 90 will flow directly across the slot 96 and into the opening in the low-pressure extension 92. The air entering the opening will then travel to the control device and then through the air line 98 or 100 to the associated pneumatic cylinder 80 and 82.

When the edge extends into the slot 96 a sufficient distance to be disposed between the respective aligned openings in the extensions 90 and 92, the air pressure in the respective air return line will be low. Conversely, if the edge does not extend far enough into the slot 96 to block the two aligned openings the air pressure in the respective air return line will be high. Accordingly, the pressures in the return lines 98 and 100 are functions of the position of the edge and particularly whether or not it extends upwardly between the openings.

If the top of the edge 50 or 52 terminates somewhere between the top and bottom openings, the air pressure in the line from the top opening will be high and the pressure in the line from the bottom opening will be low. This combination of pressures is effective to energize the two level air cylinders 80 and extend the pistons to their full limit. The two screws 95 are adjusted so as to keep the arm 70 in the horizontal or neutral position whereby the edge 50 or 52 is kept at a constant level.

However if the edge is too high and extends above the top opening the air pressures in both lines 98 will be low. This combination of pressures is effective to release the pressure from the two level cylinders 80 and cause the pneumatic control device to actuate the cylinders 82 whereby the arm 70 is rotated and the rollers 66 and 68 are "cocked" into the downwardly inclined position. The screw 97 is adjusted to control the amount of this cocking. As a result, the rollers 66 and 68 are effective to guide the edge downwardly. When the edge 50 or 52 has descended so that its top is below the top hole, the air will be free to travel across the slot 96 and the pressure in the top return line 100 will rise. The rollers 66 and 68 will be returned to the neutral position whereby the edge will remain at a constant level.

Conversely, if the edge 50 or 52 is too low, the bottom hole will be uncovered whereby the air may flow freely across the slot 96. As a result the pressure in the bottom line 98 will rise and the pneumatic control device will be effective to energize the cylinders to "cock" the rollers into the upwardly inclined position. The screw 99 is adjusted to control this amount of cocking. The edge will then be guided upwardly until it again blocks the lower aligned opening and again is at the correct elevation. The control device will then cause the rollers 66 and 68 to be returned to their mutual position whereby the edge 50 or 52 will be maintained at this level.

It may thus be seen the tops of the edges 50 and 52 will be continuously guided at a substantially constant elevation somewhere between the upper and lower holes in the shoes 90 and 92.

The two pickups 88 in the guides 58 and 60 maintain the two edges 50 and 52 of the strip 46 forming the vapor barrier 24 properly aligned with respect to each other. It may be seen this arrangement is effective to support the vapor barrier whereby it carries the insulting blanket and the core without any additional conveyor belts, etc. In addition, the pickup 88 should be set high enough to pull the vapor barrier 24 upwardly and maintain a preselected transverse tension therein. This insures the blanket 22 of insulating material compressed being firmly held against the core 14 with a substantially uniform pressure.

The edges 50 and 52 are also maintained properly aligned with the rest of the components in the duct and also with respect to the various parts of the machine and particularly the forming and sealing stations 28 and 30. A guide or shoot 29 may be provided to ride upon the top of the insulating blanket 22 and force the edges together to form a tight, smooth seam. Also the guide 29 may include a long tail which extends up into the duct to keep the insulating material from entering into the overlapping seam formed in the vapor barrier.

The guides 58 and 60 support the two edges 50 and 52 and keep them properly positioned and aligned. However, if the span of the strip 46 is very long it has been found desirable to provide one or more additional pickups for each side so as to support the strip 46. Also this will provide a more precise positioning of the two edges 50 and 52 just as they enter into the sealing station 30.

Figure 4:
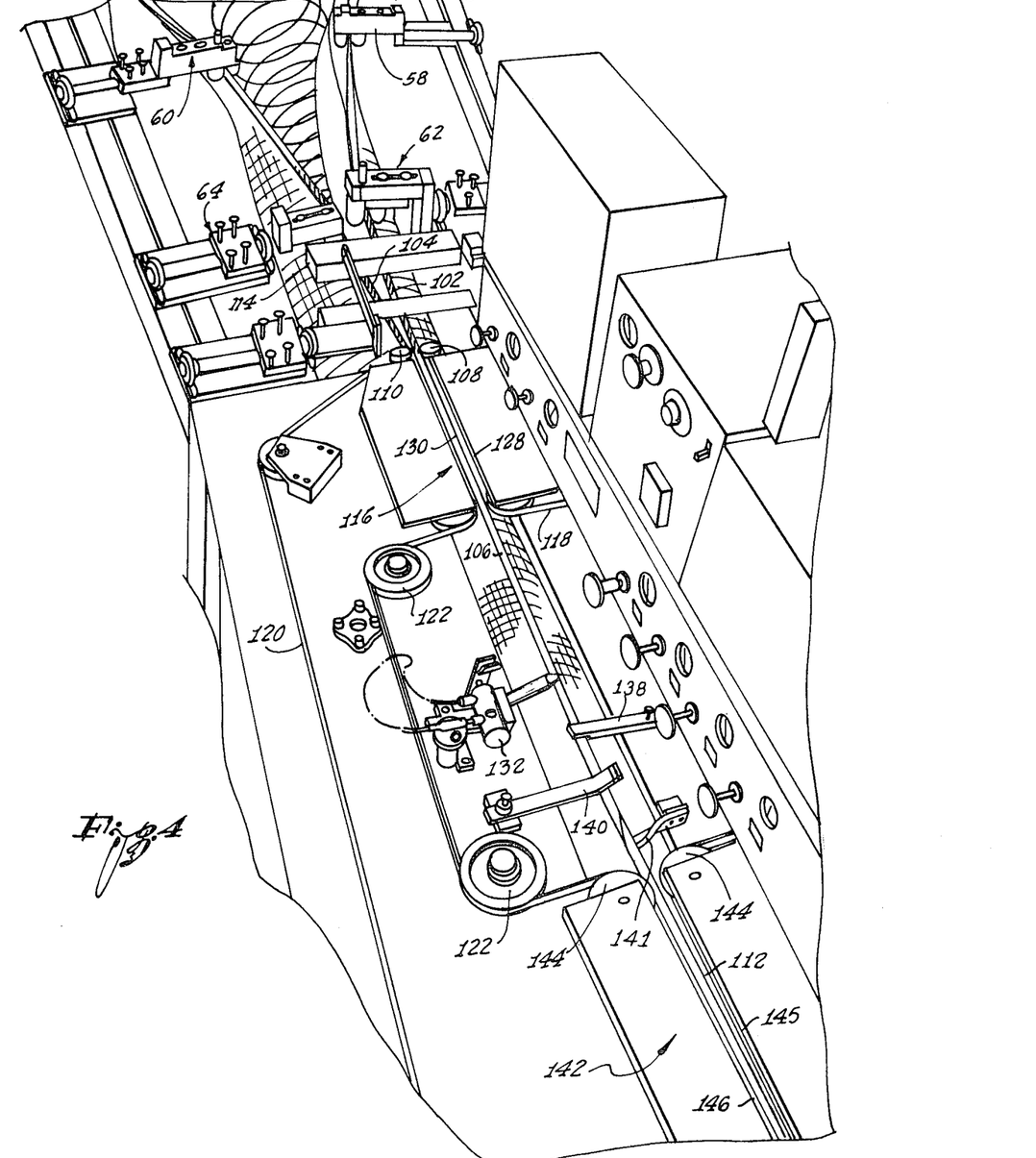
FIG. 4 is an overhead perspective view of the forming station and the sealing station of the machine.

The guides 62 and 64 may be substantially identical to the first guides 58 and 60. Each of these guides 62 and 64 also include pairs of rollers 66 and 68 and a pickup 88 for scanning the edges 50 and 52 of the strip 46. As may be seen in FIG. 4 one of the guides 64 (i.e., the right one when looking in the direction of travel) is set to form a lip or flap 104 along the right side of the assembly.

In this particular embodiment the flap 102 is disposed immediately adjacent the seam in the insulating layer 20. The flap 102 projects upwardly by an amount corresponding to the height of the final seam 106.

Another guide 64 on the left side is set to form a second lip or flap 104 along the left side of the assembly. The flaps 102 and 104 are positioned immediately adjacent to each other and to the seam in the insulating layer 20. If a single thickness seam 106 is to be formed this flap 104 extends upwardly to about the same height as the first flap 102. If, as in the present embodiment, a double thickness seam 106 is to be formed the flap 102 is about double in height of the finished seam.

As best seen in FIG. 6 an auxiliary guide 101 having a small roller to fit between the flaps 102 and 104 and a larger roller to fit outside of the flap 104 may be provided to insure a more precise alignment.

A pair of pinch rollers 108 and 110 are provided immediately behind the guides 62, 64 and 101 and at the front of the sealing station 30. These rollers 108 and 110 are effective to force the two flaps 102 and 104 tightly together. These rollers 108 and 110 are actuated by a suitable pickup and pnuematic control as described above for moving the flaps 102 and 104 up and down relative to the height of the sealing station 30.

The sealing station 30 includes means for permanently securing the two flaps 102 and 104 together to form a seam 106. This may be accomplished by stapling, riveting, etc. However in the present instance the flaps 102 and 104 are glued together by means of a glue spreader 114.

The spreader 114 applies a bonding material, such as hot glue to the mating surfaces of one or both of the flaps 102 and 104 just before they pass between the two pinch rollers 108 and 110. The glue may be applied in a continuous strip or as a series of closely spaced "dots."

Shortly after the glue is applied the two flaps 102 and 104 pass between the pinch rollers 108 and 110. This will tightly compress the two flaps 102 and 104 together and insure the glue bonding them. It is highly desirable for the glue to be of a variety that "sets up" rapidly. Normally even though an extremely fast setting glue is employed it will require a somewhat longer period of time than is required for the flaps 102 and 104 to pass between the two pinch rollers 108 and 110.

It is, therefore, desirable to provide additional means for holding the flaps 102 and 104 tightly compressed together for an extended period of time. In the present instance this is accomplished by means of a "caterpillar" 116. The "caterpillar" 116 includes a pair of endless belts 118 and 120 disposed on the opposite sides of the seam 106.

The two belts 118 and 120 are driven by a plurality of toothed pinions 144 which engage teeth on the backsides of the belts 118 and 120. The two belts 118 and 120 rotate in opposite directions whereby the segments 124 and 126 of each belt 118 and 120 next to the seam 106 are traveling in the same direction as the duct 12.

The belt segments 124 and 126 can thus engage both sides of the seam 106 and compress the flaps 102 and 104 together without in any way sliding, slipping, etc., thereon. In addition to compressing the seams together these segments are effective to provide the primary transportation for moving the duct through the machine. The pinions 144 (see FIG. 5) may be synchronously driven with the conveyor belt 147 whereby the belts 118 and 120, the duct 12 and the conveyor belt 147 will all run at the same speed.

A pair of backup shoes 128 and 130 (FIGS. 6 and 7) are provided to ride on the backs of the belts 118 and 120 and apply pressure thereto. This will keep the pressure substantially uniform over the entire lengths of the segments 124 and 126.

The shoes 128 and 130 may be spring biased against the belt segments 124 and 126. However, in the present instance a pair of pneumatic devices are provided for moving the shoes 128 and 130 between a retracted position and an extended position. The amount of force the shoes 128 and 130 apply to the belt segments 124 and 126 and to the seam 106 are adjusted by the amount of air pressure supplied to the pneumatic devices.

By a proper choice of the speed at which the duct 12 travels the length of the belt segments 124 and 126, etc., the time required for the seam 106 to traverse the compression area within the "carterpillar" may be made somewhat longer than required for the glue to set up and permanently bond the flaps 102 and 104 together.

At this point the seam 106 leaving the "caterpillar" 116 is of only one thickness. A seam 106 at this nature may be adequate for many applications. However for other applications as in the present instance, it may be desirable for the seam 106 to be of a double thickness. To provide a double thickness seam 112 the guides 58, 60, 62, and 64 are set to make the flap 104 project upwardly by an amount equal to the height of the seam 112 and the flap 104 projects upwardly by about twice this amount.

Figure 5:
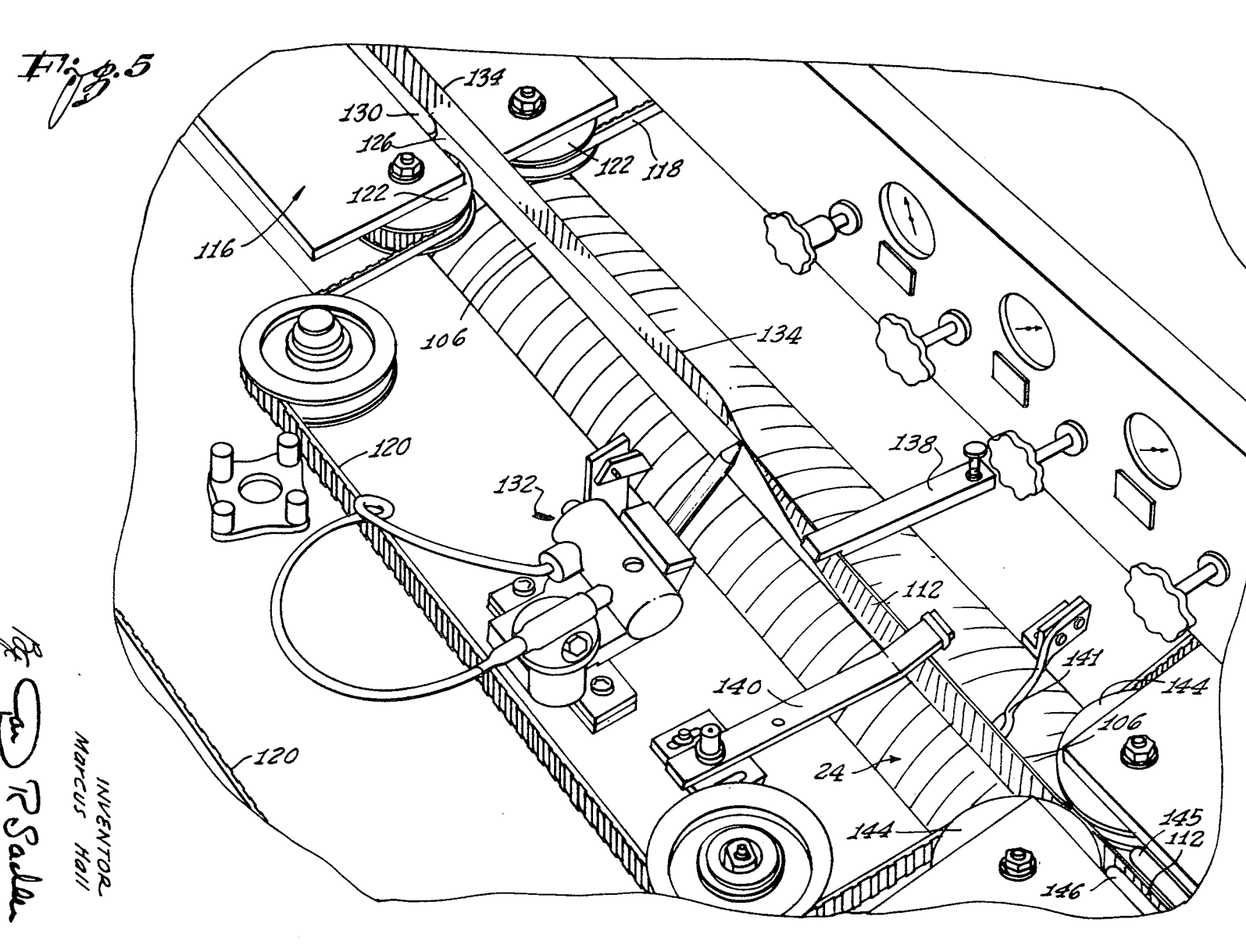
FIG. 5 is an overhead perspective view similar to FIG. 4 taken from a slightly different angle and on an enlarged scale showing a portion of the sealing station.

A second glue spreader 132 as best seen in FIG. 5 is provided behind the "caterpillar" 116 for applying glue to the upper exposed portion 134 of the flap 104. Guide means are provided for folding the upper portion 134 of the flap 104 down and around the outside of the previously glued seam 106 so as to form a double thickness seam 112.

The present guide means includes a first arm 138 which slides along the upper portion 134 of the flap 104. This creases the flap 104 at the top of the seam 106 and folds the portion 134 at least partially thereover. The end of a second arm 140 engages the partially folded portion 134 and folds it the rest of the way down to form a double seam 106. It has been found desirable to provide a third arm 141 that engages the opposite side of the double seam 112. This arm 141 keeps the seam 112 in vertical position and insures the edge being completely folded down tightly against the seam 112.

A second "caterpillar" 142 (best seen in FIGS. 1 and 4) is provided for forcing all of the flaps 102 and 104 in the seam 112 tightly together and keeping them tightly compressed together until the glue is permanently set up. The second "caterpillar" 142 is substantially identical to the first and includes a set of geared pinions 144 adjacent the seam 112. These pinions 144 guide segments 145 and 146 of the belts 118 and 120 against the opposite sides of the double seam 112.

A pair of backup shoes are also provided for riding on the backs of the belts 118 and 120 and forcing them against the seam 106. These shoes may be controlled by the same control for the shoes 128 and 130 or as in the present embodiment they may be separately controlled for movement between the extended and retracted positions. By the time the double seam 112 is discharged from the second "caterpillar" 142 it will be of a double thickness and the glue therein will have become permanently set up.

It has been found desirable to provide some form of transport means for carrying the duct 12, particularly the finished duct 12, as it leaves the machine 10. In the present instance this includes a flexible endless conveyor belt 147 which starts beneath the table. The height of the conveyor belt 147 is adjustable to match the diameter of the duct 12. The belt 147 is normally set to just engage the bottom of the duct 12 as it enters the sealing station 30.

Substantially all of the weight of the finished duct 12 is carried by belt 147 so as to reduce the vertical load on the "caterpillars" 116 and 142.

The pinions 144 for driving the belts 118 and 120 in the two "caterpillars" 116 and 142 and the conveyor belt 147 may be driven by a common electric motor. This may be accomplished by a common gear drive situated beneath the table for coupling the motor to the belts. However, in the present instance the pinions 144 are driven by a first variable speed electric motor 149 while the conveyor belt 147 is driven by a second variable speed electric motor 151. The second electric motor 151 is a "slave" to the first motor 149. The second electric motor 151 is a "slave" to the first motor 149. This is accomplished by means of an electrical follower system which is energized from the speed control for the first motor 149 but controls the speed of the second motor 151. This arrangement will insure the second motor 151 running at a speed which is some percentage of the speed of the first motor 149. This may be 100 percent (i.e., the two speeds are equal or a slightly higher percentage such as 100 percent to 105 percent) As a result whenever the speed of the first motor 149 is varied the speed of the second motor 151 will be varied by a corresponding amount.

Normally if as in the present instance, the duct being fabricated is of a flexible nature it has been found desirable to run the conveyor 147 at a speed which is slightly faster than the speed of the belts 118 and 120 in the two "caterpillars" 116 and 142. This will be effective to maintain a slight pull on the portion of the duct in the caterpillars as it is being formed. It has been found under other circumstances, for example when making a rigid duct, it is perferable to run the two belts at identical speeds whereby the tension in the duct is eliminated.

Having thus described an embodiment of the invention what is claimed is:

1. Apparatus for continuously making indefinite lengths of a substantially cylindrical insulated duct having a central reinforcing core, an inner layer of insulation surrounding said core and an outer protective wrapper enclosing said layer of insulation, said apparatus including the combination of a storage station for storing the components of said duct including an indefinite length of said core a roll of insulation having a width approximately equal to the circumference of the core and a roll of a protective wrapper having a width in excess of the insulation, a forming station, a pulling and sealing station for pulling the protective wrapper which in turn carries the insulation and core from the storage station and through the forming station and the finished duct from the pulling and sealing station as a completely assembled finished duct, first means in said forming station for effectively grasping the opposite edges of the protective wrapper as it travels therethrough whereby at least the center portion of said wrapper is suspended between said first means, said first means being effective to guide the edges to maintain them properly aligned and to maintain a preselected transverse tension in the suspended central portion, second means for guiding said insulation onto the central portion of said wrapper whereby said insulation is carried upon the suspended portion of the wrapper as it enters the forming station, said second means being effective to position the insulation on the wrapper whereby at least one of said edges is exposed, third means for continuously guiding the core into the insulation whereby the core is carried by the insulation, said forming station being effective to continuously from said wrapper around the core whereby the insulation is forced into a substantially cylindrical shape around the core, said forming station being effective to maintain the edges of said wrapper adjacent each other as it leaves the forming station, and sealing station for continuously sealing said adjacent edges together to form a seam which extends the length of said duct.

2. The apparatus of claim 1 wherein the forming station includes means for continuously changing the suspended center portion of the protective wrapper and the insulation carried thereby into an inwardly tapering conical shape coaxial with the core whereby the protective wrapper is effective to form the insulation around the core.

3. The apparatus of claim 1 wherein said first means includes at least one pair of guide rollers for each edge of the wrapper, each of said pairs of guide rollers being effective to roll along the opposite sides of its respective edge and thereby grip the edge as the wrapper is fed through the forming station, control means operatively coupled to said pairs of rollers and effective to vary the positions of the pairs whereby the position of an edge varies as it travels between the rollers, and a pickup for scanning an edge and producing a signal corresponding to the position thereof, said pickup being coupled to the control means and effective to vary the position of a pair of rollers to maintain the edge at a predetermined elevation as it travels between the rollers.

4. The apparatus of claim 3 wherein the sealing station includes means for applying a bonding material to at least one edge of the wrapper, and means for forcing said edges together to bond said seam together.

5. Apparatus for continuously making indefinite lengths of a substantially cylindrical insulated duct having an inner layer of insulation and an outer protective wrapper, said apparatus including the combination of a storage station for storing the components of said duct including a strip of said protective wrapper and a blanket of said insulation, first means for gripping the opposite edges of said strip of protective wrapper as it leaves the storage station whereby the center portion of the strip is suspended therebetween, said first means being effective to control the positions of said edges and the transverse tension in said suspended center portion of said strip, second means for guiding the blanket of insulation onto the top of said wrapper whereby said blanket is carried upon said suspended center portion of the wrapper, a forming station for continuously forming said blanket of insulation and wrapper into a substantially cylindrical shape corresponding to the shape of said duct whereby the opposite edges of said wrapper are disposed adjacent each other as they leave the forming station, and a sealing station for continuously sealing said adjacent edges to together to form a seam which extends the length of said duct.

6. The apparatus of claim 5 including means for guiding a central core onto said blanket of insulation, and said forming station is constructed and arranged to form said blanket of insulation and strip of protective wrapper around said core.

7. The apparatus of claim 5 wherein said first means includes at least one pair of mating guide rollers for each edge of said strip of protective wrapper, the rollers in each of said pairs being effective to clamp its respective edge therebetween to thereby guide the edge and said strip as they continually travel through said first means, a pickup for scanning said edge and producing a signal corresponding to the position thereof, and control means operatively coupled to said pairs of rollers for controlling the positions of said rollers, said control means being responsive to said signal and effective to position the rollers to maintain said edge at a predetermined elevation as it travels through said first means.

8. A machine for continuously making indefinite lengths of duct having an inner layer of insulation and an outer cover, said machine including the combination of a storage station including means for storing an indefinite length of said layer of insulation and means for storing an indefinite length of said outer cover, a transport for continuously feeding the indefinite lengths of said outer cover from said storage station and into and through said machine, a forming station for continuously forming said layer of insulation and cover into the shape of said duct, first guide means for continuously guiding the layer of insulation onto said cover as the cover continuously travels from the storage station to the forming station, second guide means for continuously guiding each of the opposite edges of said cover as it continuously travels from the storage station and into the forming station, and a sealing station for continuously sealing said edges of the cover together.

9. The machine of claim 8 wherein the second guide means includes a pickup means for each edge of the cover, each of said pickup means being adapted to scan the respective edge of said cover and produce a signal corresponding to the position of said edge, and positioning means for each edge of the cover effective to control the position of said edge, said positioning means being coupled to the respective pickup means and responsive to the signal therefrom to maintain said edges properly positioned relative to each other and to the forming and sealing stations.

10. The machine of claim 9 wherein each of said pickup means includes aligned airholes positioned adjacent the respective edge of the cover to produce air pressure signals corresponding to the position of said edge, and said positioning means is responsive to said air pressure signals and is effective to move said edge relative to the airholes.

11. The machine of claim 9 wherein each of said positioning means includes a pair of rollers positioned to engage the opposite sides of the cover and clamp the edge therebetween, and means for varying the positions of said rollers whereby the positions of the edge changes as it travels therebetween.

12. A machine for continuously making indefinite lengths of duct having an inner layer of insulation and an outer cover, said machine including the combination of a storage station including means for storing an indefinite length of the layer of insulation and means for storing an indefinite length of said outer cover, said outer cover being a thin, flexible sheet which is wider than the layer of insulation, a transport for continuously feeding the indefinite length of said cover through said stations, guide means for continuously guiding the layer of insulation onto said cover as the layer and cover continuously travel from the storage station, a forming station for continuously forming said cover and the layer of insulation thereon into a cylindrical shape corresponding to the shape of said duct, and a sealing station for continuously sealing said cover in said cylindrical shape and around the layer of insulation.

13. The machine of claim 12 wherein said transport applies a tractive force on said cover whereby said cover acts as a conveyor for carrying the cover and insulating layer into the forming station.

14. The machine of claim 13 wherein the sealing station includes means for applying glue to at least one edge of the cover, and means for folding the edges of the cover over each other whereby said edges are glued together and a seam is formed.

15. The machine of claim 14 including a "caterpillar" having a pair of endless belts positioned on the opposite sides of said seam for applying pressure thereto for compressing the edges together as they pass therethrough 16. A machine for continuously making indefinite lengths of a cylindrical duct having an inner flexible core surrounded by an insulating layer and an outer vapor barrier, said machine including the combination of means for continuously feeding an indefinite length of a strip of said vapor barrier axially into said machine, means for continuously feeding an indefinite length of a blanket of insulation onto said strip with at least one edge of said strip extending beyond the edge of said blanket, means for continuously feeding an indefinite length of said flexible core longitudinally onto said blanket so as to extend lengthwise thereof, guide means for continuously and progressively forming said strip and insulating blanket circumferentially around said core with the edges of the strip being positioned adjacent each other, means for continuously and progressively forming said edges into a seam extending lengthwise of said duct and sealing said seam, and a pair of counter rotating drivers disposed on the opposite sides of the seam, said drivers engaging the opposite sides of the seam and compressing it together.

* * * * *